Patented Aug. 9, 1949

2,478,826

UNITED STATES PATENT OFFICE 2,478,826

RECLAIMING SYNTHETIC RUBBER BY MEANS OF PHENYL-BETA-NAPHTHYL-AMINE

Theodore A. Johnson and Harry H. Thompson, Akron, Ohio, assignors to Wingfoot Corporation, Akron, Ohio, a corporation of Delaware No Drawing. Application December 13, 1943, Serial No. 514,104

3 Claims. (Cl. 260—2.3)

This invention relates to a method of reclaiming or regenerating synthetic rubbers and, more particularly, to a method of reclaiming polymerized chlorobutadiene and the rubber-like copolymer of butadiene and acrylonitrile known generally as a Buna N type material.

Synthetic rubbers present a somewhat different problem in reclaiming from that presented by natural rubber because the treatments to which the materials are subjected may result in polymerization and embrittlement. Hence, it is essential that the preliminary treatment be one which will put the rubber in suitable condition for the subsequent processing steps, which may be those customarily employed in the treatment of natural rubber, without deleteriously affecting the rubber.

It has been found that synthetic, rubber-like, polymerized chlorobutadienes, such as the materials sold as neoprene by the E. I. du Pont de Nemours and Company, and rubber-like copolymers of butadiene and acrylonitrile, such as the Buna N type rubber-like materials, are advantageously subjected to treatment with phenyl beta naphthylamine to render them amenable to subsequent recovery operations. It is known that such rubbers are often treated with phenyl beta naphthylamine during the curing process. However, any such chemical used in the curing process is entirely dissipated by the time the vulcanized product is ready for reclaiming, or if any phenyl beta naphthylamine is still present in the rubber, it is present in such small amounts as to have only a negligible effect on softening.

According to this invention, the phenyl beta naphthylamine is mixed with the rubber in amounts at least as great as 5 parts per 100 of the rubber being reclaimed; and, preferably, as much as 10 or 20 parts or even up to 25 parts may be used, depending upon the softening effect desired. The rubber is brought into intimate and prolonged contact with the amine, as by comminuting the rubber and mixing it with the amine. The treatment of the rubber with the amine is carried out at an elevated temperature and, preferably, under pressure. Usually, heating in the presence of about 20 parts of phenyl beta naphthylamine for a period of six to ten hours at a temperature of 250–350° F. under a pressure of 50–75 pounds will effect the desired softening of the rubber. The amount of amine and the temperature and pressure employed will depend upon the amount of softening desired, etc.

It will be understood that the temperature of 250–350° F. may be varied somewhat, but usually the temperature should not vary more than 50° above or below this range. Likewise, while the method will ordinarily be carried out at atmospheric pressure or above, it may be operated at less than atmospheric pressure and as low as the highest degree of vacuum practically obtainable. The time of treatment may also be varied somewhat from the above prescribed, sufficient softening being usually obtainable in a period of three to twelve hours. The subsequent treatment of the rubber after softening may follow the procedure used in the reclaiming of natural rubber. This will usually involve repeatedly passing the material being reclaimed through refiner rolls to form a rough, continuous sheet, straining so as to remove metal, and then slabbing on finisher refining rolls.

What we claim is:

1. In a method of reclaiming a vulcanized, rubber-like, synthetic material selected from the group consisting of polymerized chlorobutadiene and copolymers of butadiene and acrylonitrile, the step which comprises mixing with said vulcanized rubber-like material about 5 to 25 parts of phenyl beta-naphthylamine per 100 parts of the rubber-like material and then softening the vulcanized rubber-like material by heating the mixture at a temperature between about 200° F. and 400° F.

2. In a method of reclaiming vulcanized polymerized chloroprene, the step which comprises heating the vulcanized polymerized chloroprene in comminuted form with about 5 to 25 parts of phenyl-beta-naphthylamine per 100 parts of polymerized chloroprene at a temperature between about 200° F. and 400° F. until the vulcanized, polymerized chloroprene is softened.

3. In a method of reclaiming a vulcanized, rubber-like copolymer of butadiene and acrylonitrile, the step which comprises heating the vulcanized copolymer in comminuted form with about 5 to 25 parts of phenyl-beta-naphthylamine per 100 parts of copolymer at a temperature between about 200° F. and 400° F. until the vulcanized copolymer is softened.

T. A. JOHNSON.
HARRY H. THOMPSON.

REFERENCES CITED

The following references are of record in the file of this patent:

UNITED STATES PATENTS

| Number | Name | Date |
|---|---|---|
| 2,317,385 | Koch | Apr. 27, 1943 |
| 2,324,980 | Kilbourne | July 20, 1943 |